US012718714B2

(12) United States Patent
Rivera

(10) Patent No.: US 12,718,714 B2
(45) Date of Patent: Aug. 25, 2026

(54) TUBULAR SIGN FRAME

(71) Applicant: Daniel Rivera, Apache Junction, AZ (US)

(72) Inventor: Daniel Rivera, Apache Junction, AZ (US)

( * ) Notice: Subject to any disclaimer, the term of this patent is extended or adjusted under 35 U.S.C. 154(b) by 0 days.

(21) Appl. No.: 18/440,896

(22) Filed: Feb. 13, 2024

(65) Prior Publication Data

US 2025/0259570 A1 Aug. 14, 2025

(51) Int. Cl.
*G09F 7/18* (2006.01)

(52) U.S. Cl.
CPC ........ *G09F 7/18* (2013.01); *G09F 2007/1821* (2013.01)

(58) Field of Classification Search
CPC ........................... G09F 7/18; G09F 2007/1821
See application file for complete search history.

(56) References Cited

U.S. PATENT DOCUMENTS 3,868,630 A * 2/1975 Lesondak ............... E01F 13/02 116/63 P
D279,942 S * 8/1985 Vasquez ........................ D21/800
4,718,668 A * 1/1988 Schipske ................ A63B 63/00 473/462
4,878,303 A * 11/1989 Banniza .................... G09F 7/20 40/607.1
5,083,390 A * 1/1992 Edman ...................... G09F 7/18 40/607.1
D346,081 S * 4/1994 Turner ......................... D6/681.1
D384,979 S * 10/1997 Greene, Jr. ..................... D20/41
5,938,203 A * 8/1999 Beckwith, Sr. ............ F41J 1/10 273/407
D478,939 S * 8/2003 McReynolds ................ D21/302
6,718,669 B1 * 4/2004 Hayes ................. G09F 15/0068 40/610
7,198,273 B1 * 4/2007 Advocate ............. A63B 43/007 273/343
7,213,356 B2 * 5/2007 Haggard, Jr. ......... G09F 21/042 40/607.1
D591,358 S * 4/2009 Moore .......................... D21/302
7,661,213 B2 * 2/2010 Gainey ................... G09F 15/00 40/607.1
7,797,869 B2 * 9/2010 Tollis .................. G09F 15/0037 40/607.04
D834,669 S * 11/2018 Goodman .................... D21/780
(Continued)

*Primary Examiner* — Gary C Hoge

(57) ABSTRACT

An ultra lightweight tubular sign frame entirely made from polyvinyl chloride otherwise known as PVC. This material is very strong, yet extremely lightweight. Tubular sign frame is comprised of hollow tubing and hollow fittings that can be assembled by hand in just minutes. It's an upright design and completely free standing allowing it to be easily transported in a vehicle or stored in a garage. Tubular sign frame is designed to hold, exhibit and display two dual sided, double stacked separate sign boards one above the other. This unique design concept ensures the tubular sign frame to stand tall and achieve maximum visibility. Pre-drilled holes at the top of the frame are supplied to insert mini flags to further enhance and maximize exposure of the complete tubular sign frame. The design also has removable threaded cement-filled stands which can easily be attached or detached from the frame in seconds.

7 Claims, 6 Drawing Sheets

(56) References Cited

U.S. PATENT DOCUMENTS

| | | | | | |
|---|---|---|---|---|---|
| D897,137 | S * | 9/2020 | Schluentz | D6/681.2 | |
| 11,097,382 | B2 * | 8/2021 | Power | B23K 37/00 | |
| D990,564 | S * | 6/2023 | McDonnell | D20/41 | |
| 2002/0125644 | A1 * | 9/2002 | Knudson | A63B 65/00 | 273/398 |
| 2005/0082761 | A1 * | 4/2005 | Lynch | A63B 67/10 | 273/343 |
| 2006/0125184 | A1 * | 6/2006 | Benson | A63B 67/002 | 273/343 |
| 2006/0185206 | A1 * | 8/2006 | Du Bose | G09F 7/18 | 40/610 |
| 2007/0257438 | A1 * | 11/2007 | Deal | A63B 67/06 | 273/343 |
| 2009/0077849 | A1 * | 3/2009 | Glass, Jr. | G09F 15/00 | 40/606.03 |
| 2009/0278316 | A1 * | 11/2009 | LaMarte | A63B 67/06 | 273/343 |
| 2010/0187830 | A1 * | 7/2010 | Saavedra | F03D 5/06 | 290/55 |
| 2011/0127723 | A1 * | 6/2011 | Haynes | F41J 1/10 | 273/407 |
| 2014/0325821 | A1 * | 11/2014 | Redmon | G09F 19/18 | 29/428 |
| 2018/0104558 | A1 * | 4/2018 | Sweeney | A63B 63/00 | |
| 2020/0068860 | A1 * | 3/2020 | Bajer | A01K 71/00 | |
| 2020/0292930 | A1 * | 9/2020 | Long | G03B 21/58 | |
| 2022/0142128 | A1 * | 5/2022 | Blood | A01K 61/73 | |

* cited by examiner

001 - 002

TUBULAR SIGN FRAME

FIELD OF INVENTION

This invention relates to modular, portable display signs in general.

BACKGROUND OF INVENTION

Typical signs are used to advertise, display, exhibit, and communicate in various kinds of businesses or personal uses. Examples of such use include: a yard sale, garage sale, home for rent, home for sale, open house, etc. They come in a variety of styles, shapes, sizes, and configurations, and are also made from different materials. Such materials include metal, steel, wood, or heavy plastics. Some of these signs have their drawbacks, challenges and limitations.

For example, an A frame can be heavy, bulky, and typically sit low to the ground resulting in obstruction of its exposure and visibility. Additionally, some are known to buckle if not fully opened properly. They are also limited to displaying one sign per side. Some may have one sign and smaller rider per side.

Wood signs may also be heavy, bulky, more fragile, break easily and may also result in splinters.

Steel A frames may contain similar characteristics to a plastic frame but also tend to rust.

In addition, there are steel upright signs which need to be hammered into the ground. This specific sign may require tools in order to be installed if the soil is frozen, has pebbles or rocks. If it is not pounded deep enough into the ground, it may topple over due to a lack of stability.

The subject invention will provide a practical and permanent solution to most of the drawbacks, challenges and limitations described above with the previous sign frames.

Subject invention is a tubular sign frame made entirely from polyvinyl chloride otherwise known as PVC. The sign is strong yet ultra lightweight, water resistant and will not rust or conduct electricity.

The design will include two dual sided, double stacked sign boards, which make the sign stand tall and more visible. Two small vertical holes on the top of the sign are pre-drilled to insert mini flags giving further exposure to the sign which can be seen from afar. Removable threaded cement filled stands is another great benefit to this design. To fasten the stands together, turn them clockwise and to remove the stands, turn them counterclockwise. This also makes it simple and easy to transport in a vehicle or store in a garage. Despite the fact that the frame is ultra lightweight, the added weight of the cement-filled stands make it hold firm to the ground or floor without toppling over. The subject invention can be utilized in any type of business, for both inside or outside use.

BRIEF SUMMARY OF THE INVENTION

Said invention is a tubular sign frame entirely made from polyvinyl chloride plastic (PVC). The tubular sign frame consists of 17 separate pieces with four hollow vertical tubes. Each tube has machined sign grooves to insert various types of sign boards, such as, thin plywood, cardboard, chipboard, aluminum and corrugated plastic, which is the most commonly used for this application.

Additionally, there are three hollow horizontal support bridge tubes—one of them having two small pre-drilled vertical holes to insert a mini flag pole in each hole, thus, giving the entire tubular sign frame maximum visibility and exposure.

Lastly, there are 10 hollow fittings which connect and join all of the tubes mentioned above. The sign consists of two elbows, four 3-way T-connectors, two internal connecting sleeves and two threaded male adaptors. There are no tools required to assemble the tubular sign frame, it's all done by hand and takes minutes to do so.

This frame is ultra lightweight, very strong, sturdy, durable, weather resistant, water resistant and will not rust, corrode, or conduct electricity.

The design displays two dual sided, double stacked sign boards simultaneously, one above the other. This design ensures that the tubular frame sign stands tall and allows for maximum visibility. For example, you can insert an open house sign on the top portion of the frame and a real estate firm sign on the bottom portion of the frame or vice versa. Another example includes a restaurant or coffee shop name on top and menu or pricing on the bottom portion. Signs historically attract customers, increase revenue and business, create jobs etc.

Another great feature of this tubular sign frame are the threaded cement-filled stands. These stands easily attach or detach from the frame by simply turning clockwise to install them or turning counterclockwise to remove them, making the entire tubular sign frame easy to transport in a vehicle or store in a garage.

Each set has two stands. Each stand consists of five parts each: two end caps, two cement-filled tubes and one female threaded 3-way T-connector.

The Standard stands are optimal for indoor use in places such as: malls, stores, banks, shops, offices, car dealers, etc.

The Heavy Duty (optional) stands with a wider stance and thicker tubing are designed for outdoor use and are more resistant to wind.

This tubular sign frame is compatible with both types of stands.

When it is windy outside, the empty spaces above and below the center horizontal support bridge tube help wind flow through the frame in order to maintain stability. Round tubes and round fittings also give tubular sign frames an aerodynamic benefit by reducing drag and enhancing its stability. Under windy conditions the frame will also have some flexibility as well. Despite the fact this tubular sign frame is ultra lightweight, the added weight of the cement-filled stands aid in making it hold firmly to the ground or floor.

In conclusion, this is a completely free standing, triple support bridge designed tubular sign frame. This distinct design offers versatility, innovation, is user friendly and has unique features that no other sign frames offer.

BRIEF DESCRIPTION OF STANDS

Figure 1:
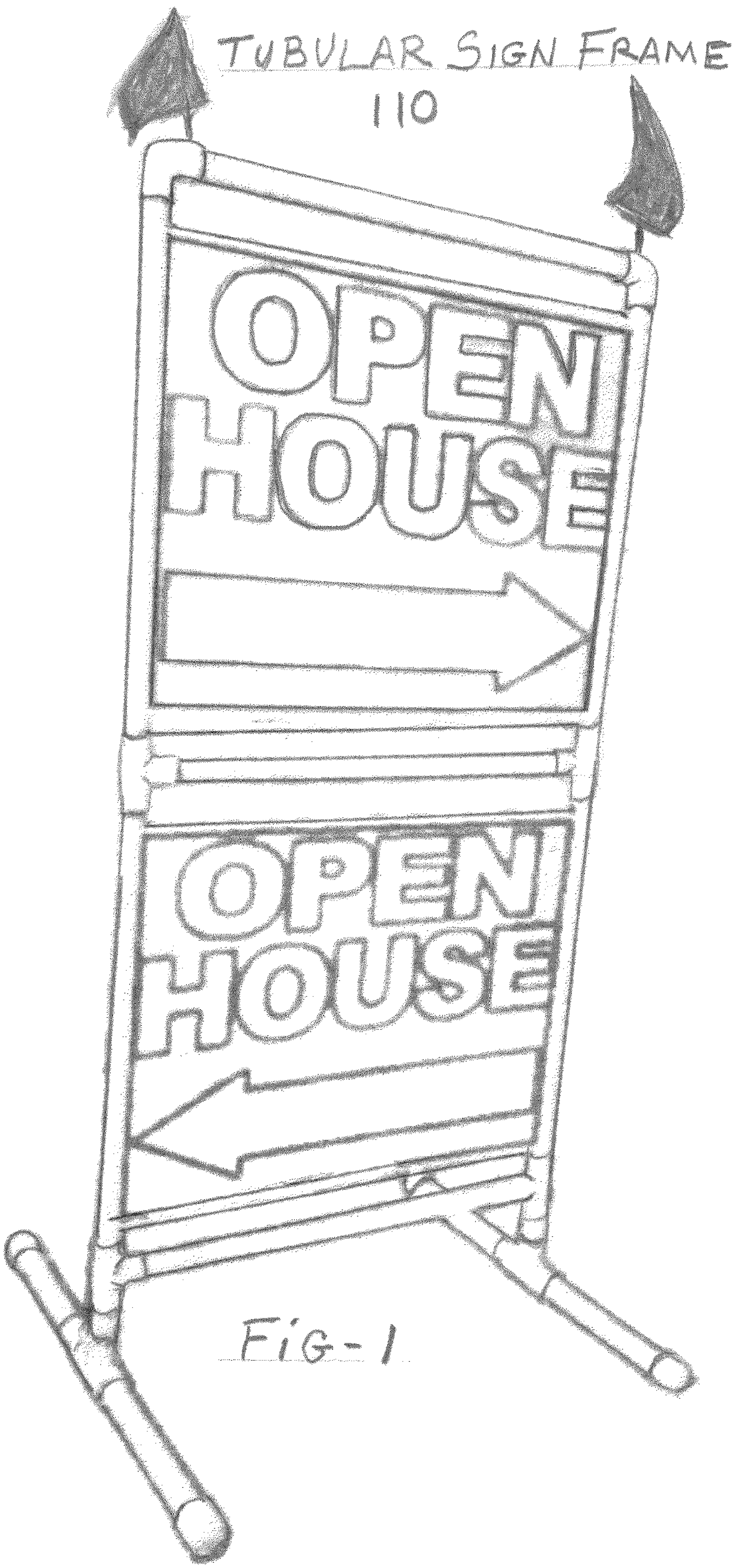
FIG. 1 Isometric view: Tubular sign frame with heavy duty stands. Displaying open house signs, and mini flags. (Please note) Mini Flags and open house signs are for illustrative purposes only, as per present invention.

All stand parts are permanently bonded together with PVC cement glue and thus making all stands pre-assembled.

(Standard Stands): 001

Each stand consists of two end caps 118 connected to two equal length tubes, cement-filled 117. They are then horizontally inserted into both smooth sides of the 3-way T-connector 116. The vertical female threaded side of 116 attaches or detaches to and from 115 male threaded adapter on frame by simply turning clockwise to attach or counter-clockwise to detach.

(Heavy Duty Stands): 002

Each stand consists of two end caps 124 connected to two equal length tubes, cement-filled 123. They are then horizontally inserted into both smooth sides of the 3-way T-connector 122. The vertical female threaded side of 122 attaches or detaches to and from 115 male threaded adapter on frame by simply turning clockwise to attach or counter-clockwise to detach.

BRIEF LIST OF REFERENCE NUMBERS PERTAINING TO THE DRAWINGS

110: Tubular Sign Frame (without stands)
111: Mini flag pole vertical holes, 2-ea. On top of 90 degree elbows (112)
111*a*: Mini flag pole holes on top of horizontal bridge tube (120*a*)
112: 90 degree elbow, 2-ea (with mini flag pole vertical holes)
113: 3-way T-connector, 4-ea.
114: Internal connecting sleeve, 2-ea.
115: Threaded (male) adapter, 2-ea.
116: 3-way T-connector one side (Female) threaded, used for Standard stands, (001) 2-ea.
117: Standard Stand arm tubes (cement-filled), 4-ea.
118: End caps connected to (117) stand arms tubes, 4-ea.
119: Machined sign grooves into vertical tubes (121), 4 ea. (sign board not included)
120: Horizontal bridge tubes, 2-ea.
120*a*: Horizontal bridge tube with mini flag pole vertical holes (111*a*) 1-ea.
121: Vertical tubes with machined sign grooves (119) 4-ea.
122: 3-way T-connector one side (Female) threaded for Heavy Duty stands (002) 2-ea.
123: Heavy Duty stand arm tubes (cement-filled), 4-ea.
124: End caps connected to (123) stand arm tubes, 4-ea.
001: Standard Stands.
002: Heavy Duty Stands.

DETAILED DESCRIPTION OF THE INVENTION

The following will describe the essence and embodiment of a sign frame utilized in many different fields, businesses, and industries, including personal uses. Tubular sign frame is a modular, triple support bridge design. The entire frame is made from polyvinyl chloride plastic, otherwise known as PVC.

The tubular sign frame is composed of 17 individual pieces, seven hollow tubes and 10 hollow fittings. Because of its unique design it is lightweight, strong and weather resistant. It weighs less than 2.5 pounds without stands 001 and 002 and 3 pounds with two corrugated plastic sign boards also without stands 001 and 002. Additionally, the design concept allows it to sit upright and completely free standing. It is also extremely versatile since two different types of removable stands may be attached to tubular sign frame 110.

FIG. 1 depicts an isometric view of tubular sign frame 110 with sample open house sign boards and sample mini flags (which are being displayed for illustrative purposes only). Because these two items may vary in styles, shapes, sizes, and colors, they can easily be switched or interchanged to fit the needs and wants of an individual. Mini flag poles are simply inserted into provided vertical holes 111 which are slightly narrower than the thickness of a soft drink straw.

Figure 2:
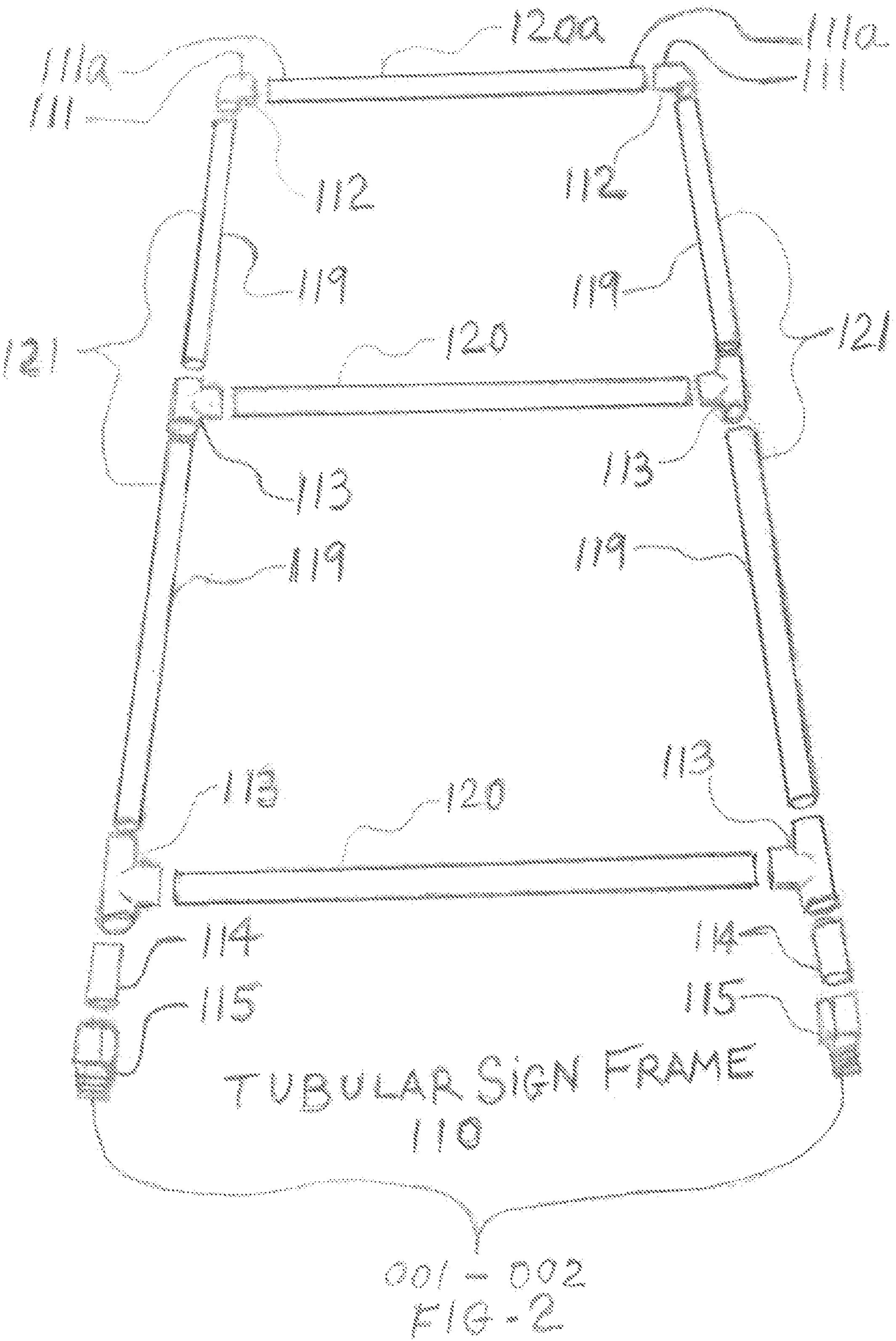
FIG. 2 Exploded view: Tubular sign frame with reference numbers. As per present invention.

FIG. 2 is an exploded view of the tubular sign frame 110, composed of 17 individual pieces within. At the top of the frame are two 45 degree angle elbows 112 with holes 111 drilled at the top side of each elbow. Horizontally inserted between both elbows is a support bridge tube 120*a* with vertical holes 111*a* drilled on opposite sides of the tube which are also aligned with drilled elbow vertical holes 111 to display two mini flags, one on each side providing maximum visibility. There are a total of four vertical tubes 121. All tubes are of equal length and diameter and also have machined sign grooves 119 to receive and hold a sign board which will be inserted into said groove. The first two vertical tubes 121 are inserted vertically into each elbow 112. The bottom end of each said tube 121 left and right are inserted into the center 3-way T-connectors 113. There are a total of four 3-way T-connectors 113, two are in the center section of the frame and two are at the bottom section of the frame. Horizontal tube 120 is then inserted between the two center 3-way T-connectors 113. There are a total of three horizontal supporting bridge tubes. Two are described as 120 and the third one previously described as 120*a*. The next two remaining vertical tubes 121 which also contain machined sign grooves 119 are inserted between the center 3-way T-connector 113 and bottom 3-way T-connectors 113. The third remaining bottom horizontal support bridge tube 120 is then inserted between the two bottom 3-way T-connectors 113. Internal connecting sleeves 114 are inserted and permanently bonded into the bottom portion of 3-way T-connectors 113 both left and right side. Lastly, the smooth sides of threaded male adaptors 115 are each connected and permanently bonded to both of the internal connecting sleeves left and to the right side of the internal connecting sleeves 114. At this point the tubular frame is complete and either stands 001 or 002 can be attached to Tubular sign frame 110.

Figure 3:
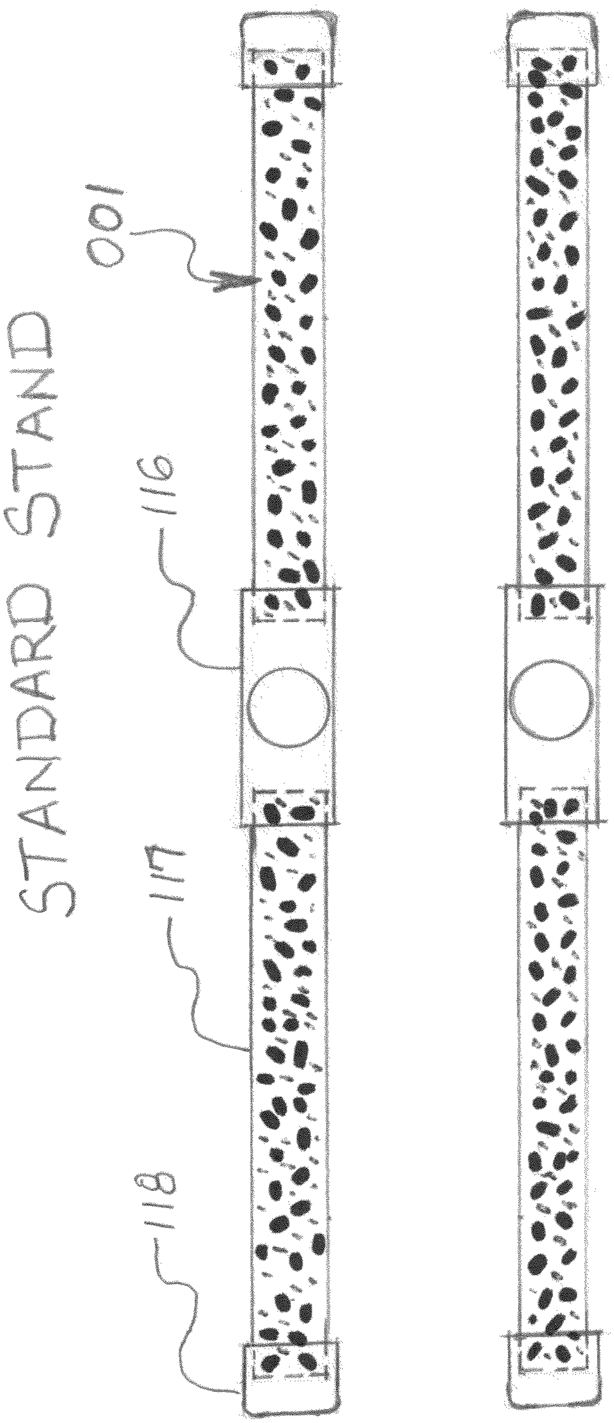
FIG. 3 Top view: Standard stands (cement-filled). As per present invention.

FIG. 3 depicts a top view of standard stand 001 sharing the same diameter tubing as the tubular sign frame 110. In which two stand arm tubes 117 both being of equal length and cement-filled are horizontally inserted and permanently bonded into one 3-way T-connector 116 in which the vertical side is female threaded, allowing attachment with threaded male adaptor 115. End caps 118 are then mated and permanently bonded to stand arm tubes 117.

Figure 4:
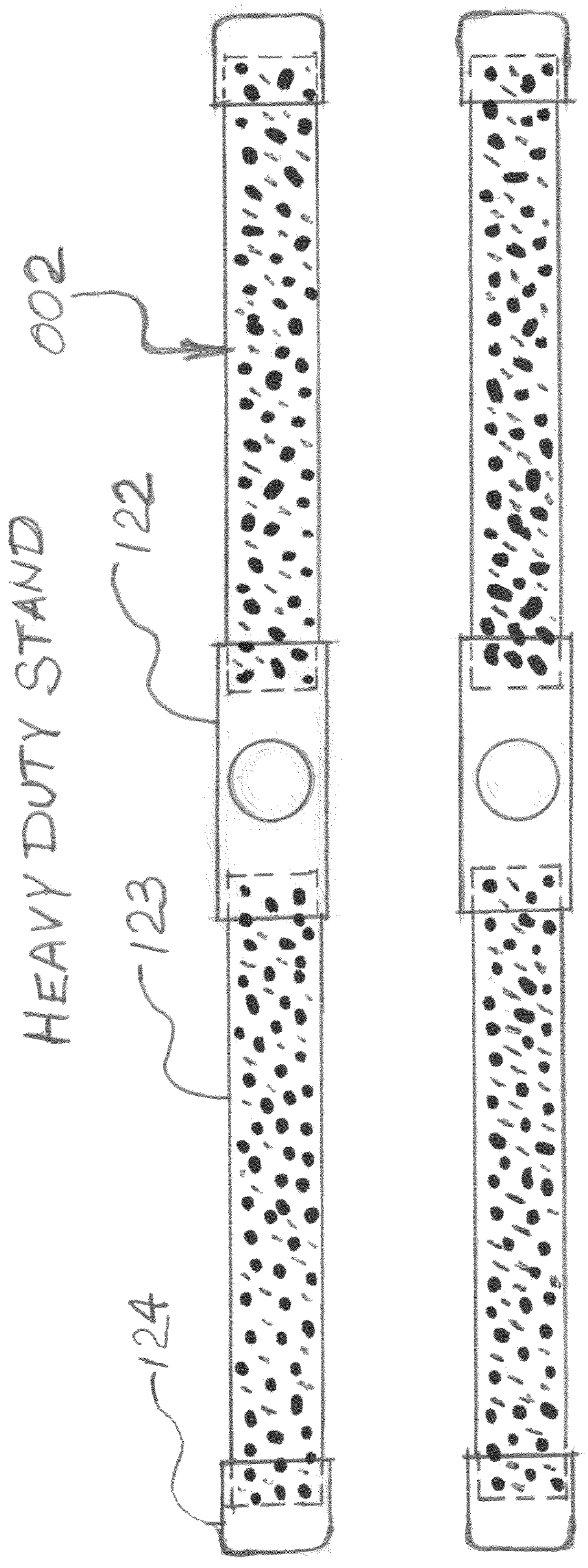
FIG. 4 Top View: Heavy duty stands (cement-filled). As per present invention.

FIG. 4 depicts a top view of heavy duty stand 002 which utilizes a longer and thicker diameter of tubing on said stands. Thus, translating to a greater capacity of cement, and making tubular sign frame 110 more wind resistant and stable. The two stand arm tubes 123, both being of equal length and cement-filled are horizontally inserted and permanently bonded into one 3-way T-connector 122 in which the vertical side is female threaded, allowing attachment with threaded male adaptor 115. End caps 124 are then mated and permanently bonded to stand arm tubes 123. Both removable stands 001 and 002 easily attach to the tubular sign frame 110 by simply mating the internal threads of stand to external threads of 115 at the bottom of the tubular sign frame 110 and then turning it to the right in a clockwise motion until it comes to a stop. After both left and right stands are fully fastened to the frame, then both stands may be aligned making sure they are perpendicular to the tubular sign frame. This is a quick, simple, and easy procedure only taking seconds to complete. To remove either set of stands 001 or 002 simply turn to the left in a counterclockwise motion until stands separate and are fully detached from external threads 115 of the tubular sign frame 110.

Figure 5:
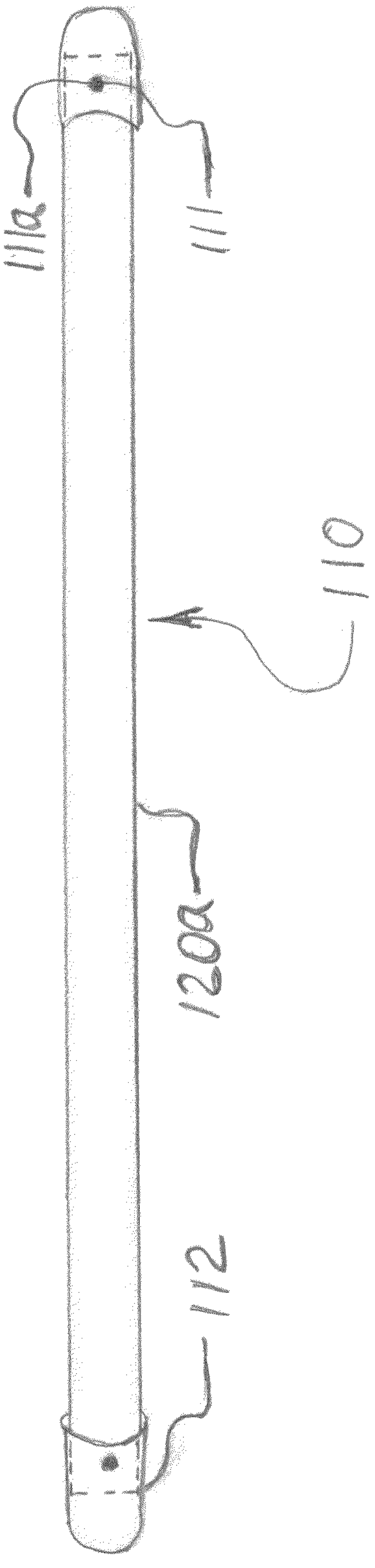
FIG. 5 Top View: Horizontal bridge tube with two drilled vertical holes at opposite ends of each other, connected between two 90 degree elbows each having drilled vertical holes. Both said holes aligning with each other. As per present invention.

FIG. 5 depicts the top view of tubular sign frame 110. Whereas two 45 degree elbows 112 are joined together by a horizontal support bridge tube 120*a*. Elbows 112 and horizontal support bridge tube 120*a* both have drilled vertical holes 111 and 111*a*, which are perfectly aligned with each other for mini flags to be inserted into each vertical hole. These flags ensure maximum visibility and exposure of the tubular sign frame 110.

Figure 6:
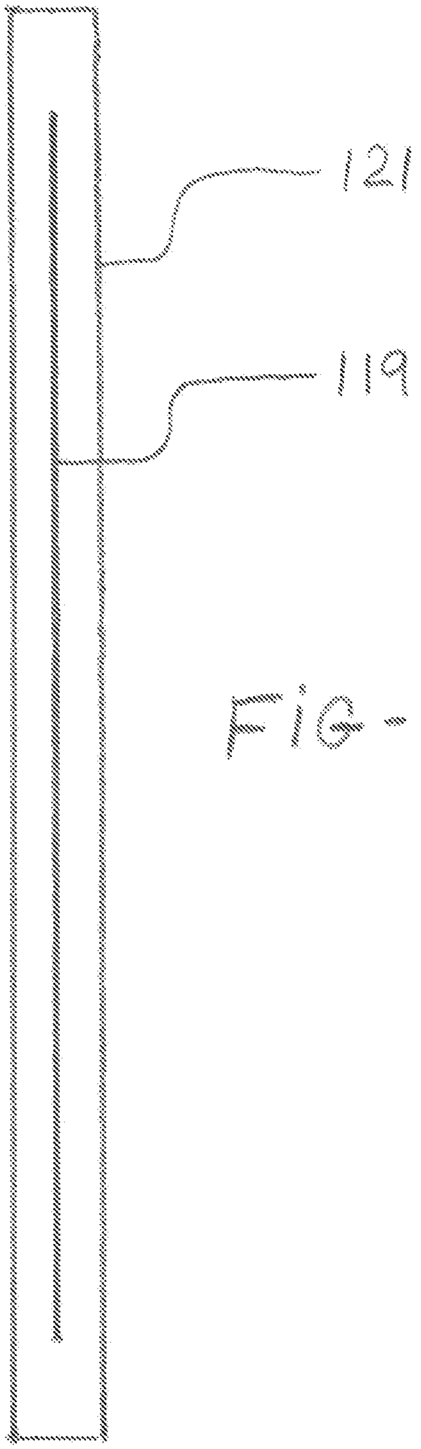
FIG. 6 Side View: Horizontal tube with machined sign groove. As per present invention.

FIG. 6 depicts vertical tube 121, which contains a total of four: an upper right, upper left, lower right and lower left. All four have the same diameter and length. All four have the same machined sign grooves 119.

Different types of sign boards may be inserted into said grooves 119, such as, thin plywood, plastic, cardboard, aluminum, particle board, or corrugated plastic, which is the most commonly used for its main characteristic of being ultra lightweight. This tubular sign frame 110 displays two dual sided, double stacked separate sign boards, potentially having four different displays simultaneously. This design allows for the frame to stand tall, maximizing its visibility and exposure. Additionally, tubular sign frame 110 is versatile, allowing users the flexibility to decide what type of sign they'd like to utilize, therefore, achieving multiple possibilities.

The tubular sign frame will also offer flexibility under mild winds. The empty spaces above and below the center horizontal support bridge tube 120 help wind flow through the tube frame, which assists in keeping it stable. Round tubes and round fittings also serve as an aerodynamic benefit, which help reduce drag and enhance stability of said tubular sign frame 110. Despite the fact tubular sign frame 110 is ultra lightweight, the added weight of either cement-filled stands 001 or 002 make it hold firmly to ground or floor. The cement-filled stands also assist in achieving great balance and equilibrium.

Tubular sign frame 110 is hand assembled, only taking a few minutes to complete without the need of any tools. Since tubular sign frame 110 contains an all white tubing frame, any type of sign displayed will be visually enhanced.

What is claimed is:

1. A tubular sign frame comprising: a hollow lightweight frame capable of displaying multiple sign boards on two sides thereof; a plurality of internal connecting sleeves a plurality of threaded stand adapters attached to said internal connecting sleeves to enable stands to be attached or detached from said frame; at least two pairs of stands, each pair of stands having a unique configuration; and each stand being filled with ballast, the ballast consisting of cement.

2. The tubular sign frame according to claim 1, wherein said frame comprises hollow PVC tubing and fittings in order to achieve said lightweight frame.

3. The tubular sign frame according to claim 1, wherein said frame comprises a plurality of vertical frame tubes each having elongated machined grooves running parallel with said tubes, at least one sign board inserted into said machined grooves.

4. The tubular sign frame according to claim 1, wherein said internal connecting sleeves are permanently bonded to the frame.

5. The tubular sign frame according to claim 1, wherein each said stand adapter is permanently bonded to one of said internal connecting sleeves.

6. The tubular sign frame according to claim 1, wherein each of said stands comprises end caps, the stands giving said sign frame stability.

7. The tubular sign frame according to claim 1, wherein each said stand comprises a 3-way T-connector which mates with one of said stand adapters, thus enabling the attachment or detachment of said stands to or from said frame.

* * * * *